(12) United States Patent
Hagans

(10) Patent No.: US 9,440,622 B2
(45) Date of Patent: Sep. 13, 2016

(54) HD MIRACLE ARM

(71) Applicant: Capus Donnell Hagans, Jacksonville, FL (US)

(72) Inventor: Capus Donnell Hagans, Jacksonville, FL (US)

(*) Notice: Subject to any disclaimer, the term of this patent is extended or adjusted under 35 U.S.C. 154(b) by 0 days.

(21) Appl. No.: 14/046,304

(22) Filed: Oct. 4, 2013

(65) Prior Publication Data

US 2014/0215738 A1 Aug. 7, 2014

Related U.S. Application Data

(60) Provisional application No. 61/761,939, filed on Feb. 7, 2013.

(51) Int. Cl.
*B60S 3/04* (2006.01)
*A47L 13/42* (2006.01)
*B25G 1/04* (2006.01)
*B25G 3/38* (2006.01)
*B25G 1/06* (2006.01)

(52) U.S. Cl.
CPC ............. *B60S 3/045* (2013.01); *A47L 13/42* (2013.01); *B25G 1/04* (2013.01); *B25G 1/06* (2013.01); *B25G 3/38* (2013.01); *Y10T 16/44* (2015.01); *Y10T 16/473* (2015.01); *Y10T 16/476* (2015.01)

(58) Field of Classification Search
CPC ......... B60S 3/045; A47L 13/42; B25G 1/04; B25G 1/06; B25G 3/38
USPC .................. 15/144.2, 144.4; 16/430, 429
See application file for complete search history.

(56) References Cited

U.S. PATENT DOCUMENTS

| | | | |
|---|---|---|---|
| 2,720,409 A * | 10/1955 | Griffith | E04D 13/0765 15/144.4 |
| 4,720,883 A | 1/1988 | Sanchez | |
| 4,901,392 A | 2/1990 | Shapiro et al. | |
| 5,810,408 A * | 9/1998 | Armstrong | 294/57 |
| 6,032,321 A * | 3/2000 | Shirey et al. | 15/244.2 |
| 6,128,800 A | 10/2000 | Vosbikian | |
| 6,155,620 A * | 12/2000 | Armstrong | 294/57 |
| 6,336,764 B1 | 1/2002 | Liu | |
| 6,625,837 B2 | 9/2003 | Jiang | |
| 6,634,822 B1 | 10/2003 | Wang | |
| 6,709,529 B1 * | 3/2004 | Mekwinski | 134/6 |
| 7,001,095 B1 | 2/2006 | Chen | |
| 7,775,736 B2 | 8/2010 | Song | |
| 7,971,311 B2 * | 7/2011 | Zielinski | 15/144.4 |
| 2003/0102010 A1 * | 6/2003 | Mays | 134/6 |
| 2009/0282634 A1 | 11/2009 | Pardini | |
| 2011/0225750 A1 | 9/2011 | Kirsch | |

* cited by examiner

*Primary Examiner* — Shay Karls
(74) *Attorney, Agent, or Firm* — Buchkingham, Doolittle & Burroughs, LLC

(57) ABSTRACT

A reaching tool device is disclosed that enables users to reach the roof of their vehicle without any hassle. The reaching tool device comprises an elongated arm, a handle secured to the arm, and at least one interchangeable head secured to the arm, opposite the handle. The elongated arm can be telescopically extended lengthwise and secured in a desired position via a push-spring button. The handle is removably secured to an end of the elongated arm via a pivoting hinge which allows the arm to pivot about the handle. Once the arm is in position, it can be secured in the desired position. The interchangeable head comprises a round or rectangular sponge, a brush, a scrubber, etc. and also a pivoting and rotating ball swivel that allows the interchangeable head to rotate and pivot and lie flat at an angle when in use.

1 Claim, 5 Drawing Sheets

HD MIRACLE ARM

CROSS-REFERENCE

This application claims priority from Provisional Patent Application Ser. No. 61/761,939 filed Feb. 7, 2013.

BACKGROUND

It can be difficult to reach the top of vehicles, especially SUVs, trucks, and vans, while cleaning. Some people may use stepstools or ladders for more height, but they can be wobbly and unstable. If people lose their balance, they can fall and injure themselves. An easier and safer solution is needed.

The present invention provides users with an easy way to reach the top of their vehicle, and allows for easy detailing, cleaning, and reaching a vehicle's roof, or any other elevated surface or item. The reaching tool device eliminates the hassle of climbing unstable stepstools or ladders, and reduces the overall amount of time it takes to clean a vehicle. This device is ideal for all vehicle owners, including SUV, truck, and van owners.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a reaching tool device that enables users to reach the roof of their vehicle without any hassle. The reaching tool device comprises an elongated arm, a handle secured to the arm, and at least one interchangeable head secured to the arm, opposite the handle. The elongated arm comprises a first end and a second end, and can be telescopically extended lengthwise and secured in a desired position via a push-spring button. The handle is removably secured to an end of the elongated arm via a pivoting hinge which allows the arm to pivot up and down. Once the arm is in position, a user can tighten a tightening knob on the side of the hinge to secure the arm in the desired position. Further, the handle can comprise a rubber grip or any other suitable gripping material. The reaching tool device further comprises at least one interchangeable head removably secured to an end of the elongated arm, opposite the handle via a push-spring button.

In a preferred embodiment, the interchangeable head comprises a pivoting and rotating ball swivel that allows the interchangeable head to rotate and pivot and lie flat at an angle when in use. Additionally, the interchangeable heads can comprise any suitable cleaning head as is known in the art, such as a round or rectangular sponge, a brush, a scrubber, etc. Furthermore, the reaching tool device can be compacted for storage and placed in a storage bag till needed.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DESCRIPTION OF PREFERRED EMBODIMENTS

Figure 1:
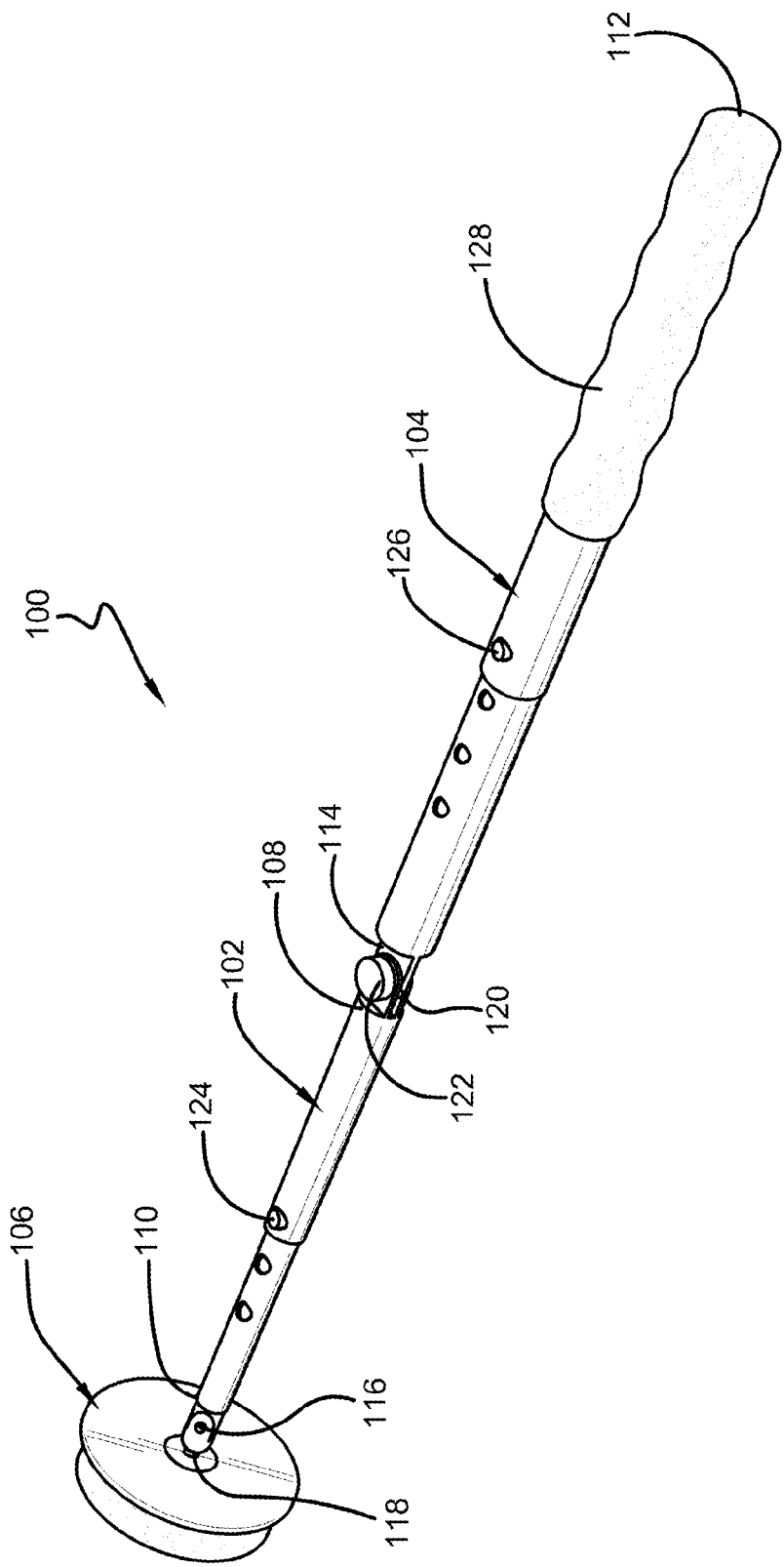
FIG. 1 illustrates a perspective view of the reaching tool device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention provides users with an easy way to reach the top of their vehicle, and allows for easy detailing, cleaning, and reaching a vehicle's roof. The reaching tool device eliminates the hassle of climbing unstable stepstools or ladders, and reduces the overall amount of time it takes to clean a vehicle. This device is ideal for all vehicle owners, including SUV, truck, and van owners.

The disclosed reaching tool device comprises an elongated arm, a handle secured to the elongated arm, and at least one interchangeable head secured to the elongated arm, opposite the handle. The elongated arm can be telescopically extended lengthwise and secured in a desired position via a push-spring button. The handle is removably secured to an end of the elongated arm via a pivoting hinge which allows the elongated arm to pivot or rotate about the handle. Once the elongated arm is in position, it can be secured in the desired position relative to the handle. The interchangeable head comprises at least one of a round or rectangular sponge, a brush, a scrubber, etc. and also a pivoting and rotating ball swivel that allows the interchangeable head to rotate and pivot and lie flat at an angle relative to the vehicle roof when in use.

Figure 2:
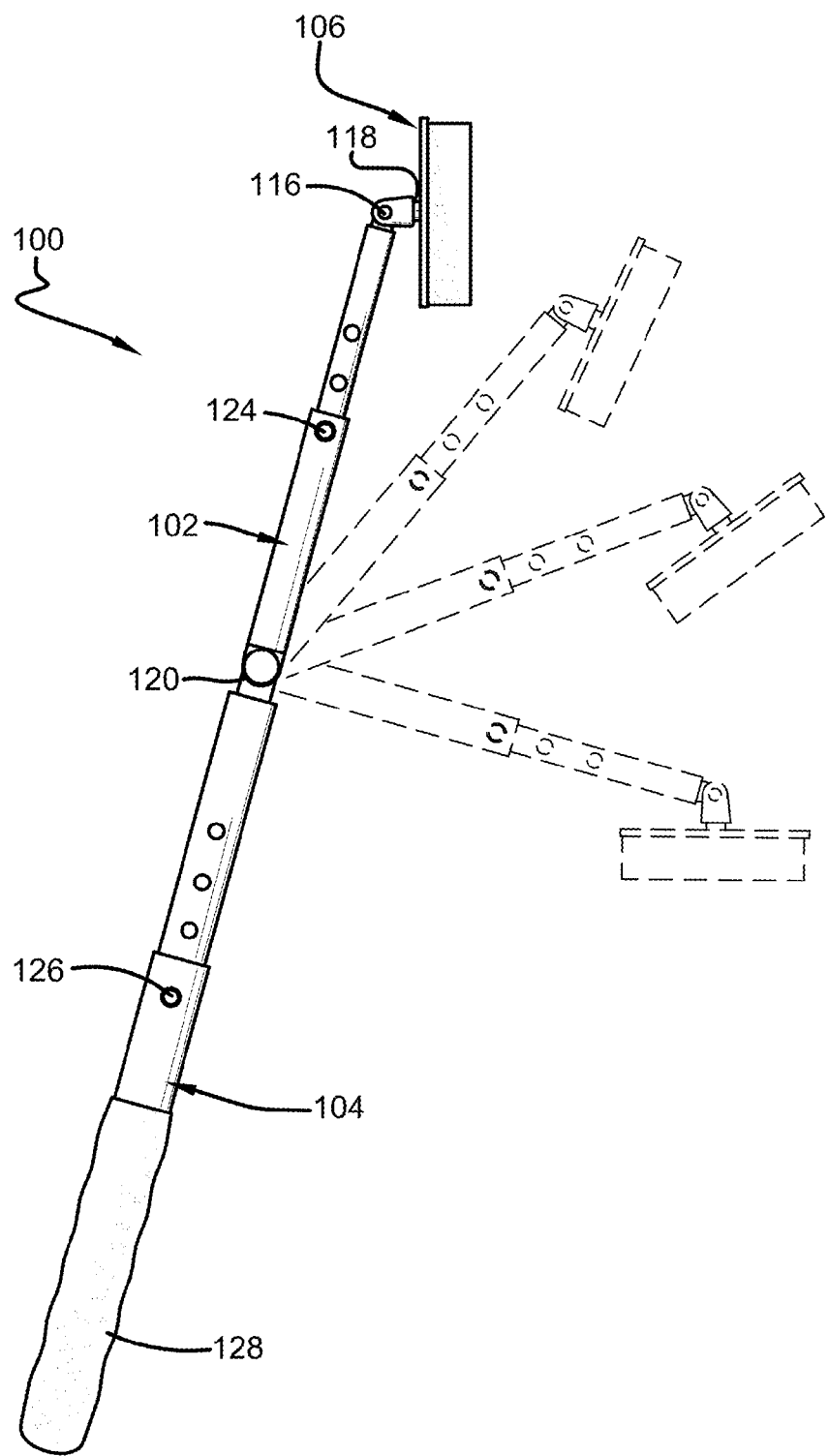
FIG. 2 illustrates a perspective view of the reaching tool device with the pivoting hinge in accordance with the disclosed architecture.

Referring initially to the drawings, FIGS. 1-2 illustrate the reaching tool device 100 that enables users to reach the roof of their vehicle without any hassle. The reaching tool device 100 comprises an elongated arm 102, a handle 104 secured to the elongated arm 102, and at least one interchangeable head 106 secured to the elongated arm 102, opposite the handle 104 (as shown in FIG. 1).

The elongated arm 102 comprises a first end 108 and a second end 110, and can be telescopically extended lengthwise and secured in a desired position via a push-spring button 124, or any other suitable securing means as is known in the art. Typically, the elongated arm 102 is cylindrical in shape, however any other suitable shape can be used as is known in the art without affecting the overall concept of the invention. The elongated arm 102 would generally be constructed of hard plastic, or metal, such as stainless steel, aluminum, etc., though any other suitable material may be used to manufacture the elongated arm 102 as is known in the art without affecting the overall concept of the invention.

The elongated arm 102 can also comprise a variety of colors and designs to suit user and manufacturing preference, and can be manufactured in a variety of sizes depending on the wants and needs of a user. In a fully extended position, the elongated arm 102 is approximately between 36 and 42 inches long as measured from a first end 108 to a second end 110 (this is the standard length when fully extended, but a user also has the option to have it manufactured to extend further if necessary), and approximately between ¾ and 1 inch in diameter.

The reaching tool device 100 further comprises a handle 104 removably secured to an end of the elongated arm 102. The handle 104 can be removably secured to either the first end 108 or the second end 110 of the elongated arm 102 via any suitable securing means such as threading, gluing, fasteners, etc. Typically, the handle 104 is secured to the elongated arm 102 via a pivoting hinge 120 which allows the arm 102 to pivot about the handle 104 (i.e., up and down, as shown in FIG. 2). Once the elongated arm 102 is in a desired position relative to the handle 104, a user can tighten a tightening knob 122 on the side of the hinge 120 to secure the elongated arm 102 in the desired position. Additionally, the handle 104 can be telescopically extended lengthwise and secured in a desired position via a push-spring button 126 or any other suitable securing means as is known in the art.

Further, the handle 104 can comprise a rubber grip 128, or any other suitable gripping material as is known in the art without affecting the overall concept of the invention. The handle 104 can also comprise a variety of colors and designs to suit user and manufacturing preference, and can be manufactured in a variety of sizes depending on the wants and needs of a user, as well as can comprise gripping for a user's fingers, or other textured surfaces for a non-slip, comfortable, and/or ergonomical grip. The handle 104 is approximately between 36 and 42 inches long as measured from a first end 112 to a second end 114, and approximately between 1 and 1⅛ inches in diameter.

The reaching tool device 100 further comprises at least one interchangeable head 106 removably secured to an end of the elongated arm 102. The interchangeable head 106 can be removably secured to either the first end 108 or the second end 110 of the elongated arm 102, opposite of the handle 104. The interchangeable head 106 is secured to the elongated arm 102 via any suitable securing means such as threading, gluing, fasteners, etc., but is preferably secured via a push-spring button 116. Further, the interchangeable head 106 can comprise a pivoting and rotating ball swivel 118 that allows the interchangeable head 106 to rotate and pivot and lie flat at an angle when in use relative to the elongated arm 102. Additionally, the interchangeable heads 106 can comprise any suitable cleaning head as is known in the art, such as a round or rectangular sponge, a brush, a scrubber, etc.

Additionally, the reaching tool device 100 can be folded up or compacted for storage. Thus, when not in use, the reaching tool device 100 can be compacted and placed in a storage bag 130 and stored away till needed or for ease in transportation. Typically, the elongated arm 102 when not extended is approximately between 42 and 44 in inches in length.

Figure 3:
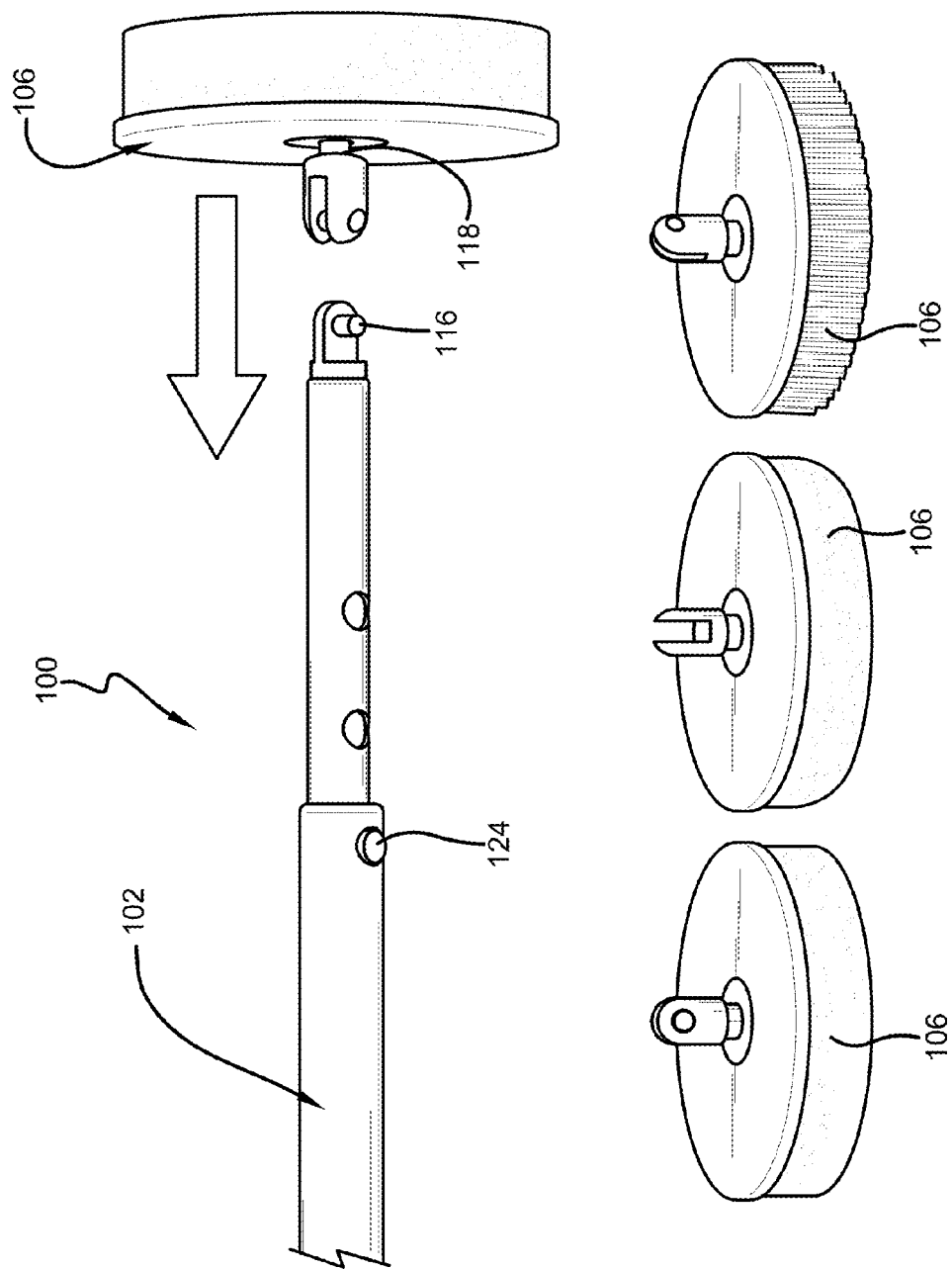
FIG. 3 illustrates a perspective view of the reaching tool device with multiple interchangeable heads in accordance with the disclosed architecture.

FIG. 3 illustrates the reaching tool device 100 with multiple interchangeable heads 106. As stated supra, the reaching tool device 100 comprises at least one interchangeable head 106 removably secured to an end of the elongated arm 102. The interchangeable head 106 can be removably secured to either the first end 108 or the second end 110 of the elongated arm 102, opposite of the handle 104 via any suitable securing means such as threading, gluing, fasteners, etc. However, the interchangeable head 106 is preferably secured via a push-spring button 116 to the elongated arm 102. The interchangeable heads 106 can comprise any suitable cleaning head as is known in the art, such as a round or rectangular sponge, a brush, a scrubber, etc. Further, the interchangeable head 106 can comprise a pivoting and rotating ball swivel 118 that allows the interchangeable head 106 to rotate and pivot and lie flat at an angle when in use relative to the elongated arm 102.

Figure 4:
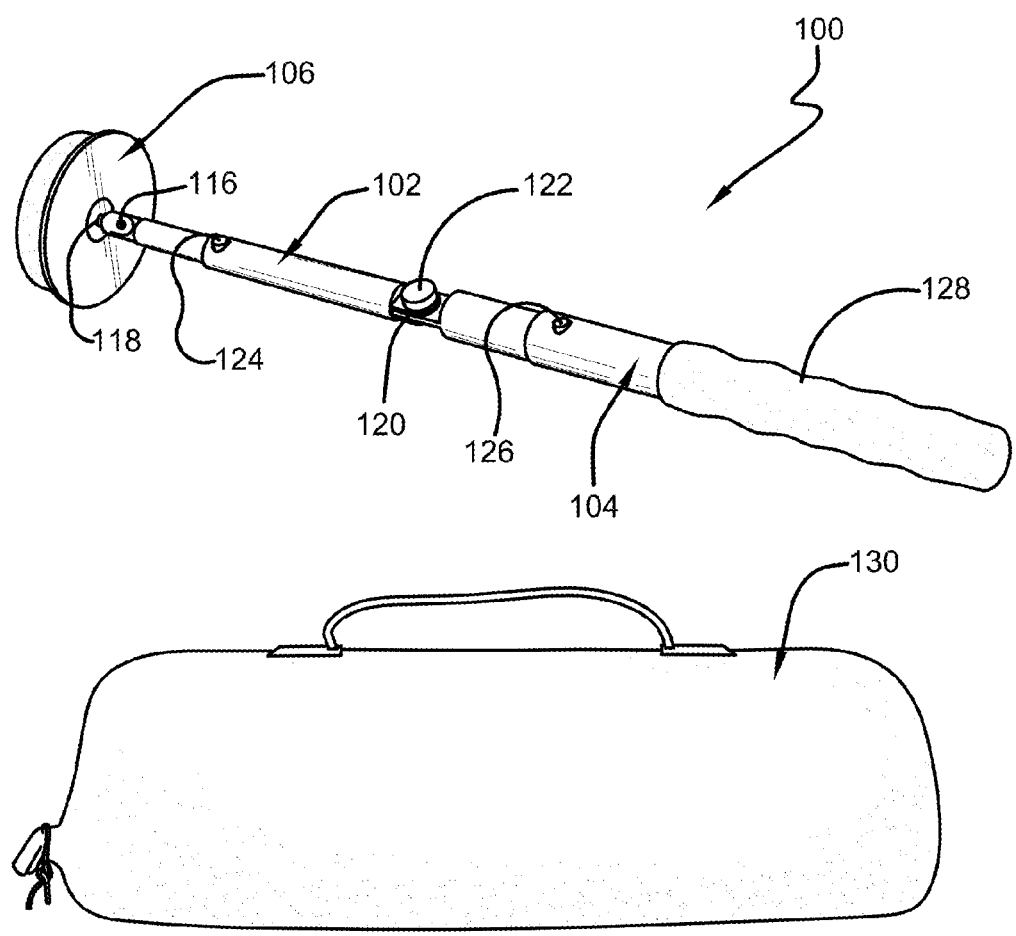
FIG. 4 illustrates a perspective view of the reaching tool device collapsed for storage within a storage bag in accordance with the disclosed architecture.

FIG. 4 illustrates the reaching tool device 100 collapsed for storage within a storage bag 130. As stated supra, the reaching tool device 100 can be folded up or compacted for storage. Thus, when not in use, the reaching tool device 100 can be compacted and placed in a storage bag 130 or other suitable container and stored away till needed. Specifically, the handle 104 would be removed from the elongated arm 102, and then the interchangeable head 106 would be removed from the elongated arm 102 as well. The handle 104 and elongated arm 102 can be collapsed back down, if telescopically extended. Then, the handle 104, the elongated arm 102, and the interchangeable heads 106 can all be placed in the storage bag 130 for storage and/or transportation.

Figure 5:
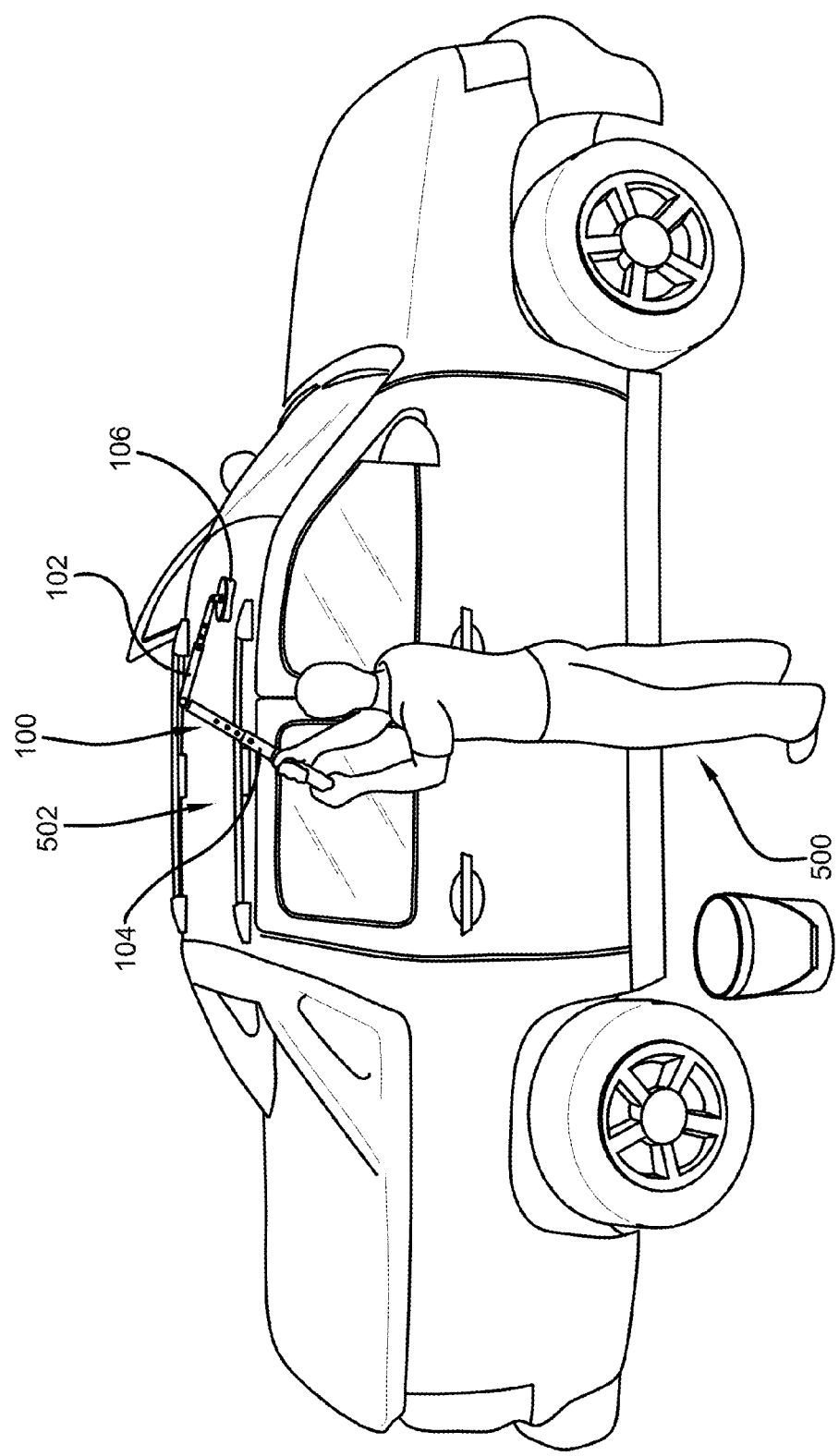
FIG. 5 illustrates a perspective view of the reaching tool device in use in accordance with the disclosed architecture.

FIG. 5 illustrates the reaching tool device 100 in use. In operation, a user 500 would choose the size and/or color of reaching tool device 100 that meets their needs and/or wants. The user 500 would then choose the specific interchangeable head 106 that fits their cleaning needs, such as a round or rectangular sponge head, a brush head, a scrubber head, etc. The user 500 would then secure the desired interchangeable head 106 to the end of the elongated arm 102 of the reaching tool device 100 via a push-spring button 116. The interchangeable head 106 can also comprise a pivoting and rotating ball swivel 118 that allows the interchangeable head 106 to rotate and pivot and lie flat at an angle when in use relative to the elongated arm 102.

Once the interchangeable head 106 is secured to the elongated arm 102, the user 500 can then extend the elongated arm 102 and the handle 104 telescopically to the desired length. Once the arm 102 and the handle 104 are positioned at the desired length, the user 500 can then secure the arm 102 and the handle 104 at the desired position via the push-spring button 124 and 126. Once secure, the user 500 can then pivot the arm 102 about the handle 104 via the pivoting hinge 120.

Once the arm 102 is in position, the user 500 can tighten a tightening knob 122 on the side of the hinge 120 to secure the arm 102 in the desired position. The user 500 can then use the reaching tool device 100 to clean the top of vehicles 502 (as shown in FIG. 5) or any other elevated surface. Once the user 500 is done cleaning, the user 500 can then compact the device 100 by collapsing the telescopically extended elongated arm, and place it in a storage bag to be stored away till needed (as shown in FIG. 4).

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A reaching tool device for use in reaching a roof of a large vehicle and for cleaning the roof without the use of a ladder comprising:
   a telescoping arm between ¾ and one inches in diameter comprising a first end and a second end, and wherein the telescoping arm can be telescopically extended and secured in a desired position via a push-spring button, and wherein in a fully extended position, the telescoping arm is between 36 and 42 inches in length;
   a telescoping handle between one and 1⅛ inches in diameter with a rubber grip removably secured to either the first end or the second end of the arm via a pivoting hinge which allows the telescoping arm to pivot about the telescoping handle, and wherein in a fully extended position, the telescoping handle is between 36 and 42 inches in length; and
   multiple interchangeable heads that are securable to both the first end and the second end of the telescoping arm;
   wherein one of the multiple interchangeable heads is removably secured to an end of the arm that is opposite of the handle via a push-spring button and comprises a rotating ball swivel which allows the one of the multiple interchangeable heads to lie flat at an angle relative to the telescoping arm; and
   wherein the pivoting hinge comprises a tightening knob that secures the telescoping arm in a desired position; and
   wherein the multiple interchangeable heads comprise a sponge, a brush, and a scrubber; and
   wherein the telescoping handle and the multiple interchangeable heads are both completely removed from the telescoping arm and all placed in a storage bag for storage after use; and
   wherein the handle comprises a non-slip, gripping for a user's fingers.

* * * * *